US012769067B2

(12) United States Patent
Deho et al.

(10) Patent No.: US 12,769,067 B2
(45) Date of Patent: Oct. 20, 2026

(54) OPTICAL TRANSCEIVER ASSEMBLY, AN OPTICAL TRANSCEIVER AND AN ADAPTOR FOR AN OPTICAL TRANSCEIVER

(71) Applicant: Telefonaktiebolaget LM Ericsson (publ), Stockholm (SE)

(72) Inventors: Alberto Deho, Genoa (IT); Roberto Magri, Genoa (IT); Claudio D'Incà, Genoa (IT); Sergio Mosti, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 317 days.

(21) Appl. No.: 18/287,876

(22) PCT Filed: Apr. 26, 2021

(86) PCT No.: PCT/EP2021/060863

§ 371 (c)(1),
(2) Date: Oct. 21, 2023

(87) PCT Pub. No.: WO2022/228655

PCT Pub. Date: Nov. 3, 2022

(65) Prior Publication Data

US 2024/0210632 A1 Jun. 27, 2024

(51) Int. Cl.
*G02B 6/38* (2006.01)
*G02B 6/42* (2006.01)

(52) U.S. Cl.
CPC ......... *G02B 6/3893* (2013.01); *G02B 6/3825* (2013.01); *G02B 6/3878* (2013.01); *G02B 6/4246* (2013.01)

(58) Field of Classification Search
None
See application file for complete search history.

(56) References Cited

U.S. PATENT DOCUMENTS

2002/0061163 A1 5/2002 Bartur et al.
2013/0094864 A1 4/2013 Duis et al.
(Continued)

FOREIGN PATENT DOCUMENTS

KR 20190068004 A 6/2019

OTHER PUBLICATIONS

PCT International Search Report, mailed Jan. 14, 2022, in connection with International Application No. PCT/EP2021/060863, all pages.
(Continued)

*Primary Examiner* — Jerry Rahll
(74) *Attorney, Agent, or Firm* — Sonoda & Kobayashi Intellectual Properly Law; Sarvajit S. Patil

(57) ABSTRACT

An optical transceiver assembly is provided. The optical transceiver assembly comprises: an optical transceiver, wherein the optical transceiver comprises: an optical transmitter comprising an active region of a cavity laser for transmitting optical signals over a first channel of the optical transceiver; an optical receiver for receiving optical signals over a second channel of the optical transceiver; and an adaptor. The adaptor comprises: a first terminal, the first terminal for coupling to one of the first channel and the second channel of the optical transceiver; a second terminal, the second terminal for coupling to the other of the first channel and the second channel of the optical transceiver; a third terminal defining a bidirectional optical channel of the adaptor; and one or more optical components configured to optically couple the first and second terminals to the third terminal, such that optical signals at a first wavelength pass between the first terminal and the third terminal, and optical signals at a second wavelength, different from the first wavelength, pass between the second terminal and the third terminal. The active region and one or more of the optical
(Continued)

components of the adaptor are together configured to form the cavity laser for transmitting optical signals over the first channel. Optical signals may be received by the optical transceiver over the second channel. The adaptor may be couplable to the optical transceiver in a first configuration, in which the first terminal of the adaptor is coupled to the first channel and the second terminal of the adaptor is coupled to the second channel, and a second configuration, in which the second terminal of the adaptor is optically coupled to the first channel and the first terminal of the adaptor is optically coupled to the second channel. An optical transceiver and an adaptor for an optical transceiver are also provided.

21 Claims, 9 Drawing Sheets

(56) References Cited

U.S. PATENT DOCUMENTS

2018/0217340 A1 8/2018 Wong et al.
2020/0393630 A1 12/2020 Wong et al.

OTHER PUBLICATIONS

PCT Written Opinion, mailed Jan. 14, 2022, in connection with International Application No. PCT/EP2021/060863, all pages.

OPTICAL TRANSCEIVER ASSEMBLY, AN OPTICAL TRANSCEIVER AND AN ADAPTOR FOR AN OPTICAL TRANSCEIVER

TECHNICAL FIELD

The present disclosure relates to an optical transceiver assembly and is particularly, although not exclusively, concerned with an optical transceiver assembly for facilitating bidirectional optical communications.

BACKGROUND

Telecommunications devices, such as radio access nodes, may comprise a plurality of optical transceivers, e.g. pluggable optical transceivers, such as Small Form-factor Pluggable (SFP) optical transceivers, for facilitating communications between the telecommunications devices provided at a particular location, e.g. within a telecommunications office.

With reference to FIGS. 1*a* and 1*b*, optical transceivers may be "common" optical transceivers, such as the optical transceiver 100 depicted in FIG. 1*a*, which comprise two optical terminals 102, 104 to couple to respective optical fibre cables in order to form send and receive connections of the optical transceiver 100 respectively.

Alternatively, optical transceivers may be bidirectional optical transceivers, such as the previously proposed bidirectional optical transceiver 150 depicted in FIG. 1*b*. As shown in FIG. 1*b*, the bidirectional optical transceiver 150 comprises a single terminal 152 to couple to a single optical fibre cable in order to form a bidirectional connection over which optical communications can be sent to and from the bidirectional optical transceiver 150.

The use of bidirectional optical communications between telecommunications devices can be desirable in order to reduce the number of optical fibre cables that are used to connect the telecommunication devices.

With reference to FIG. 2, bidirectional operations of the previously proposed bidirectional optical transceiver 150 may be based on a wavelength division multiplexing technique. For example, a first bidirectional optical transceiver 150*a* may comprise a first laser 152*a* configured to produce optical signals for transmission at a wavelength of 1310 nm and may further comprise a first diplexer 154*a* configured to pass optical signals having a wavelength of 1310 nm and direct optical signals having a wavelength of 1550 nm towards a first optical receiver 156*a* of the first bidirectional optical transceiver 150*a*. A second bidirectional optical transceiver 150*b*, to which the first bidirectional optical transceiver is optically coupled, e.g. via an optical fibre cable 200, may comprise a second laser 152*b* configured to produce optical signals for transmission at a wavelength of 1550 nm and may further comprise a second diplexer 154*b* configured to pass optical signals having a wavelength of 1550 nm and direct optical signals having a wavelength of 1310 nm towards a second optical receiver 156*b* of the second bidirectional optical transceiver 150*b*. In this way, the first and second bidirectional optical transceivers 150*a*, 150*b* are configured to enable bidirectional optical communications between one another.

One disadvantage of using bidirectional optical communications may therefore be that the bidirectional optical transceivers 150*a*, 150*b* are deployed in matched pairs, e.g. with one device in the pair being configured to transmit at a wavelength of 1310 nm and receive at a wavelength of 1550 nm and the other device in the pair being configured to transmit at a wavelength of 1550 nm and receive at a wavelength of 1310 nm.

Accordingly, the supply and management of both variants of the optical transceiver devices must be considered, and it must be ensured that the correct variants are available and are installed in the telecommunications devices that are to communicate with each another using the bidirectional optical transceivers.

SUMMARY OF INVENTION

According to an aspect of the present disclosure, there is provided an optical transceiver assembly. The optical transceiver assembly comprises: an optical transceiver, wherein the optical transceiver comprises: an optical transmitter comprising an active region of a cavity laser for transmitting optical signals over a first channel of the optical transceiver; an optical receiver for receiving optical signals over a second channel of the optical transceiver; and an adaptor. The adaptor comprises: a first terminal, the first terminal for coupling to one of the first channel and the second channel of the optical transceiver; a second terminal, the second terminal for coupling to the other of the first channel and the second channel of the optical transceiver; a third terminal defining a bidirectional optical channel of the adaptor; and one or more optical components configured to optically couple the first and second terminals to the third terminal, such that optical signals at a first wavelength pass between the first terminal and the third terminal, and optical signals at a second wavelength, different from the first wavelength, pass between the second terminal and the third terminal. The active region and one or more of the optical components of the adaptor are together configured to form the cavity laser for transmitting optical signals over the first channel. Optical signals may be received by the optical transceiver over the second channel. The adaptor is couplable to the optical transceiver in a first configuration, in which the first terminal of the adaptor is coupled to the first channel and the second terminal of the adaptor is coupled to the second channel, and a second configuration, in which the second terminal of the adaptor is optically coupled to the first channel and the first terminal of the adaptor is optically coupled to the second channel.

In this way, the wavelength at which optical signals are transmitted and received by the optical transceiver assembly may be selectively adjusted by appropriately configuring the adaptor coupled to the optical transceiver.

According to another aspect of the present disclosure, there is provided an adaptor for coupling, e.g. physically/mechanically coupling or attaching, to an optical transceiver. For example, the adaptor may be provided in the optical transceiver assembly described above. The adaptor comprises a first terminal, the first terminal for optically coupling to one of a first channel and a second channel of the optical transceiver; a second terminal, the second terminal for optically coupling to the other of the first channel and the second channel of the optical transceiver; a third terminal defining a bidirectional optical channel of the adaptor; and one or more optical components configured to optically couple the first and second terminals to the third terminal such that optical signals at a first wavelength pass between the first terminal and the third terminal, and optical signals at a second wavelength, different from the first wavelength, pass between the second terminal and the third terminal. One or more of the optical components of the adaptor are configured to cooperate with an active region of a cavity laser provided on the optical transceiver to form the cavity laser for transmitting optical signals over the first channel. The adaptor is couplable to the optical transceiver in a first configuration, in which the first terminal of the adaptor is coupled to the first channel and the second terminal of the adaptor is coupled to the second channel, and a second configuration, in which the second terminal of the adaptor is optically coupled to the first channel and the first terminal of the adaptor is optically coupled to the second channel.

The optical components of the adaptor may comprise a first optical filter configured to pass optical signals passing between the first and third terminals at the first wavelength. The first optical filter may be configured to cooperate with the active region of the cavity laser provided in the optical transceiver to define the cavity laser for transmitting optical signals over the first channel at the first wavelength, when the first terminal of the adaptor is optically coupled to the first channel of the optical transmitter.

The optical components of the adaptor may comprise a second optical filter configured to pass optical signals passing between the second terminal and the third terminal at the second wavelength. The second optical filter may be configured to cooperate with the active region of the cavity laser provided in the optical transceiver to define the cavity laser for transmitting optical signals over the first channel at the second wavelength, when the second terminal of the adaptor is optically coupled to the first channel of the optical transmitter.

The optical components may be configured such that optical signals received at the third terminal are output from one of the first terminal and the second terminal depending on a wavelength of the optical signals received at the third terminal.

The optical components may comprise a plurality of collimator lenses, configured to collimate the optical signals received at the first, second and third terminals.

The optical components may comprise a third optical filter configured to pass optical signals at the second wavelength, or within the second range of wavelengths, and reflect other optical signals, e.g. not at the second wavelength and/or not within the second range of wavelengths. The third optical filter may be configured to reflect the other optical signals at an angle relative to an incident angle of the optical signals on the third optical filter.

The adaptor may be configured such that optical signals pass through the third optical filter to pass between the second terminal and the third terminal. The adaptor may be configured such that optical signals are reflected by the third optical filter to pass between the first terminal and the third terminal. Alternatively, the adaptor may be configured such that optical signals pass through the third optical filter to pass between the first terminal and the third terminal and optical signals are reflected by the third optical filter to pass between the second terminal and the third terminal.

The adaptor may comprise a plug body to be received within a socket of the optical transceiver such that the first and second terminals of the adaptor are optically coupled to the first and second channels of the optical transceiver respectively. The adaptor may be configurable to adjust which of the first and second terminals is optically coupled to the respective first and second channels of the optical transceiver when the plug body is received within the socket.

The plug body may comprise a fixed portion and removable portion. The removable portion may be removably couplable to the fixed portion in either of a first position and a second position in order to adjust a shape of the plug body and an orientation in which the plug body can be received within the socket of the optical transceiver, to thereby adjust which of the first and second terminals is optically coupled to the respective first and second channels of the optical transceiver when the plug body is received within the socket.

The removable portion may comprise a retaining feature for engaging the optical transceiver when the plug body of the adaptor is received within the socket, the retaining feature to resist removal of the plug body from the socket. The fixed portion and the removable portion of the plug body may together form an optical connector body, e.g. a standard optical connector body, such as an LC/LC connector body or any other standard optical connector body.

The removable portion may be movably couplable to the fixed portion. The removable portion may be movable relative to the fixed portion in order to remove or attach the removable portion from or to the fixed portion.

One of the fixed portion and the removable portion may comprise an anchor feature and the other of the fixed portion and the removable portion may comprise an anchor engaging feature configured to engage the anchor feature in order to resist movement of the removable portion relative to the fixed portion. The anchor engaging feature may be biased into a position in which the anchor engaging features engages the anchor feature.

The anchor feature and the anchor engaging feature may be configured such that moving the removable portion towards the first or second position of the removable portion urges the anchor engaging feature into a configuration in which the anchor engaging feature can move to engage the anchor feature.

The fixed portion may comprise a rail. The removable portion may be movably, e.g. slideably, couplable to the fixed portion at the rail.

According to another aspect of the present disclosure, there is provided an optical transceiver, e.g. for the above-mentioned optical transceiver assembly. The optical transceiver comprises: an optical transmitter comprising an active region of a cavity laser for transmitting optical signals over a first channel of the optical transceiver; and an optical receiver for receiving optical signals over a second channel of the optical transceiver. The optical transceiver is configured to couple to an optical adaptor comprising an optical filter for passing optical signals at a wavelength, such as the first or second wavelength. The active region is configured to form the cavity laser in conjunction with the optical filter in order to transmit optical signals over the first optical channel at the wavelength.

According to another aspect of the present disclosure, there is provided an optical network node comprising one or more of the above-mentioned optical transceiver assemblies. The optical network node may be a radio access network node.

According to another aspect of the present disclosure, there is provided a network, such as a fronthaul network in a radio access network, comprising two of the above-mentioned optical network node. The optical network nodes are coupled to one another by an optical link.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION

Figure 1A:
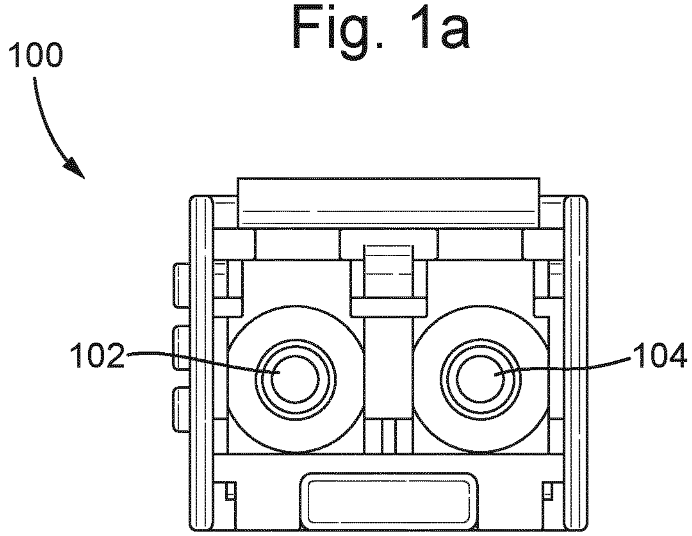
FIGS. 1*a* and 1*b* are front views of previously proposed optical transceivers.
Figure 1B:
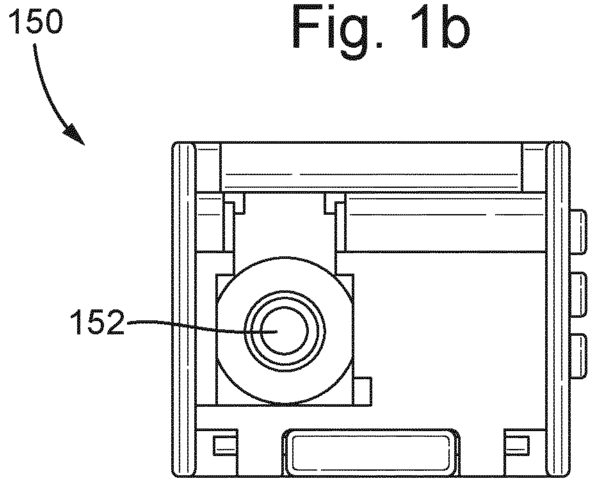
Figure 2:
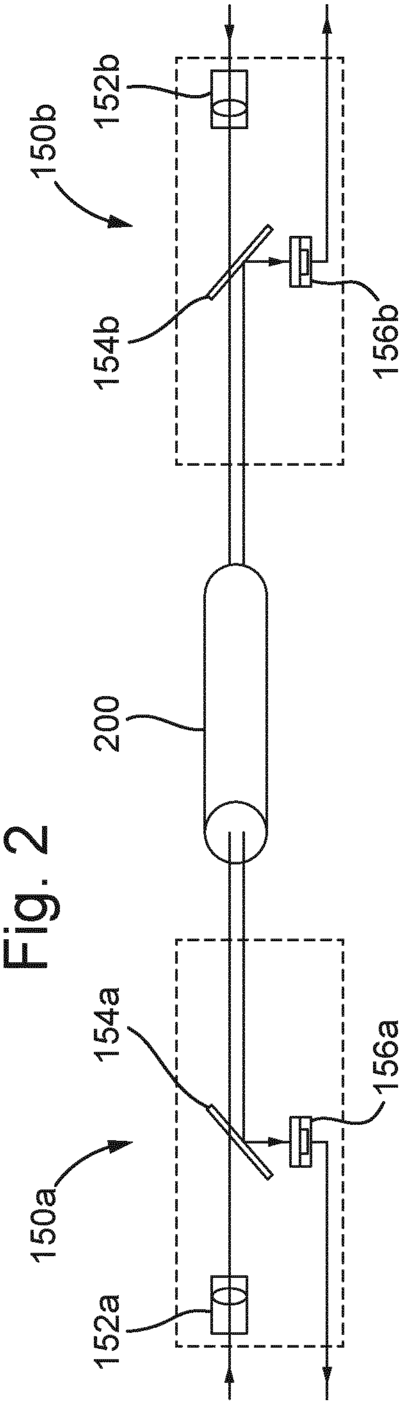
FIG. 2 is a schematic view illustrating optical components for facilitating bidirectional communications between previously proposed optical transceivers.
Figure 3:
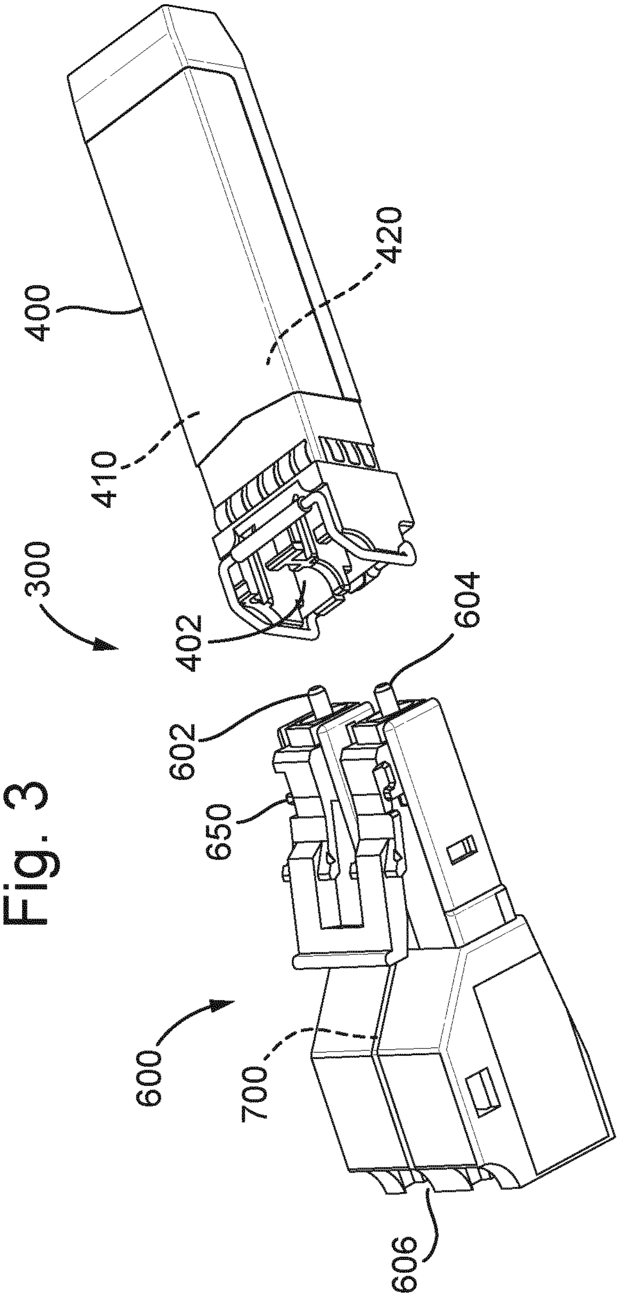
FIG. 3 is a perspective view of an optical transceiver assembly according to arrangements of the present disclosure in a disassembled condition.

With reference to FIG. 3, an optical transceiver assembly 300 according to the present disclosure comprises an optical transceiver 400 according to the present disclosure and an adaptor 600 according to the present disclosure.

The optical transceiver 400 comprises an optical transmitter 410, for transmitting optical signals on a first optical channel defined by the optical transceiver 400, and an optical receiver 420, for receiving optical signals over a second optical channel defined by the optical transceiver 400. In the arrangement, shown in FIG. 3, the optical transmitter and the optical receiver are provided within a common housing. For example, the optical transmitter 410 and the optical receiver 420 may be provided as part of a pluggable optical transceiver, such as a Small Form-factor Pluggable (SFP) optical transceiver.

The adaptor 600 is configured to couple, e.g. physically/mechanically couple or attach, to the optical transceiver 400. For example, the optical transceiver 400 may comprise a socket 402 and the adaptor 600 may comprise a plug body 650 configured, e.g. shaped, to be received within the socket 402.

The adaptor 600 comprises a first terminal 602 for coupling, e.g. optically coupling, to one of the first and second optical channels defined by the optical transceiver 400. For example, the first terminal 602 may be optically coupled to the one of the first and second optical channels of the optical transceiver when the adaptor is coupled to the optical transceiver, e.g. when the plug body 650 is received within the socket 402. The adaptor 600 further comprises and a second terminal 604 for coupling, e.g. optically coupling, to the other of the first and second optical channels defined by the optical transceiver 400.

As described in more detail below, which of the first and second terminals 602, 604 of the adaptor 600 is coupled, e.g. optically coupled, to the first and second optical channels of the optical transceiver 400 may depend on the manner and/or configuration in which the adaptor is coupled, e.g. physically/mechanically coupled or attached, to the optical transceiver 400. For example, which of the first and second terminals 602, 604 of the adaptor 600 is coupled, e.g. optically coupled, to the first and second optical channels of the optical transceiver 400 may depend the orientation in which the plug body 650 of the adaptor is receiver within the socket 402 of the optical transceiver.

The adaptor 600 further comprises a third terminal 606, defining a bidirectional optical channel of the adaptor. As described in detail below, the adaptor 600 comprises one or more optical components 700 configured to optically couple the first and second terminals 602, 604 to the third terminal 606, such that optical signals at a first wavelength or within a first range of wavelengths, pass, e.g. are permitted or caused to pass, between the first terminal 602 and the third terminal 606. The optical components 700 are further configured such that optical signals at a second wavelength, or within a second range of wavelengths, different from the first wavelength and/or the first range of wavelengths, pass, e.g. are permitted or caused to pass, between the second terminal 604 and the third terminal 606. In combination, the optical transceiver 400 and the adaptor 600 are configured to receive and transmit optical signals via the third terminal 606 of the adaptor over the first and second optical channels defined by the optical transceiver 400 respectively.

Figure 4A:
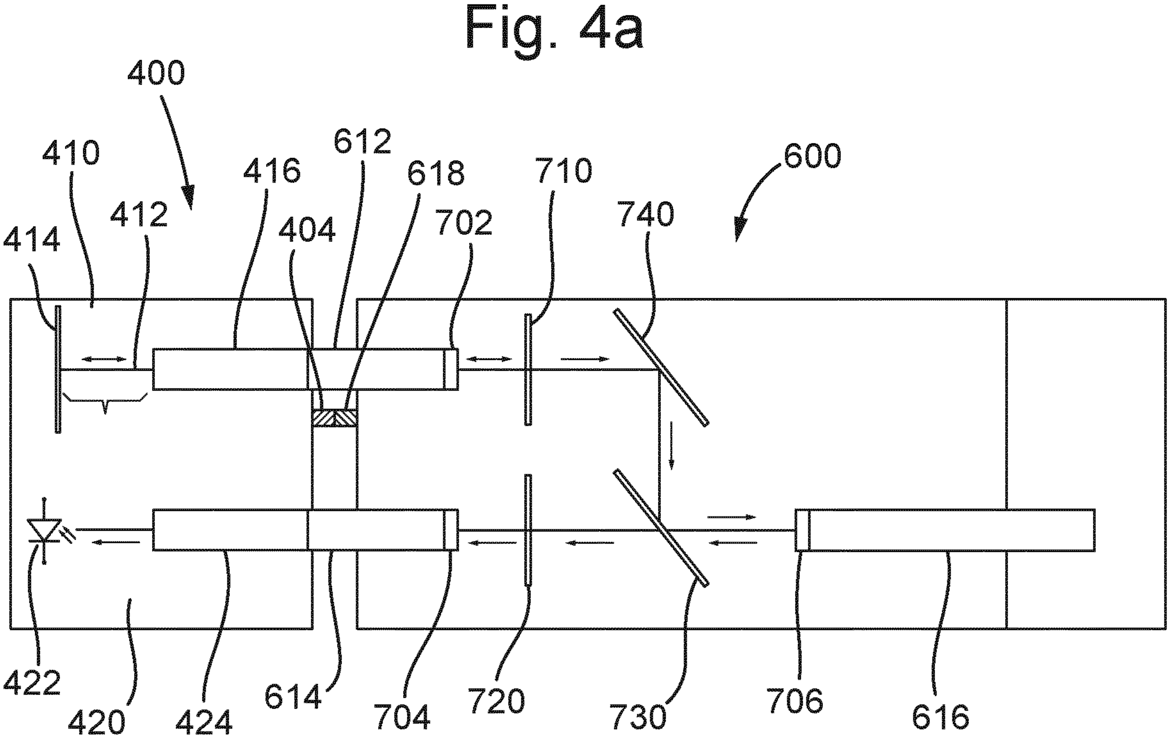
FIGS. 4*a* and 4*b* are schematic views illustrating optical components provided within the optical transceiver assembly shown in FIG. 3, when an adaptor of the optical transceiver assembly is in first and second configurations respectively.
Figure 4B:
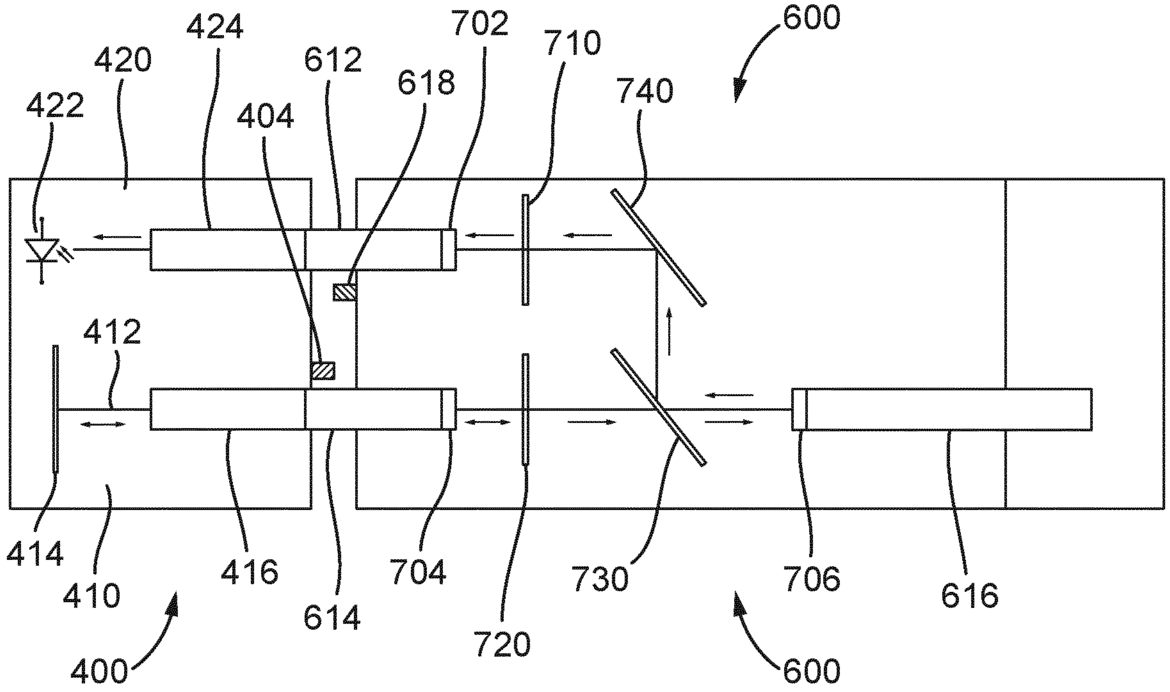

Referring now to FIGS. 4*a* and 4*b*, the optical transmitter 410 of the optical transceiver 400 comprises an active region 412 of a cavity laser. The optical transmitter 410 may further comprise a mirror 414, e.g. a full mirror, and a first transceiver waveguide 416 optically coupled to the active region 412 of the cavity laser. As depicted, the mirror 414 and the first transceiver waveguide 416 may be provided on opposite sides of the active region 412. The first transceiver waveguide 416 may comprise a fibre optic ferrule.

The optical receiver 420 may comprise a photo-detector 422, such as a photo-diode, and a second transceiver waveguide 424 optically coupled to the photo-detector 422. The second transceiver waveguide 424 may comprise a fibre optic ferrule.

The adaptor 600 may comprise a first adaptor waveguide 612 and a second adaptor waveguide 614. The first and/or second adaptor waveguides may comprise fibre optic ferrules. The first adaptor waveguide 612 may be provided at, or at least partially form, the first terminal 602 of the adaptor and the second adaptor waveguide 614 may be provided at, or at least partially form, the second terminal 604 of the adaptor. The adaptor may comprise a third adaptor waveguide 616, which may be provided at, or at least partially form the third terminal 606 of the adaptor. The third adaptor waveguide 616 may comprise a fibre optical ferrule.

The adaptor 600 may be configured to couple, e.g. mechanically/physical couple or attach, to the optical transceiver in a first configuration, depicted in FIG. 4*a*, and a second configuration, depicted in FIG. 4*b*. In the first configuration, the first terminal of the adaptor is coupled to the first channel of the optical transceiver. As depicted, when the adaptor is coupled to the optical transceiver in the first configuration, the first adaptor waveguide 612 is coupled, e.g. optically coupled, to the first transceiver waveguide 416 and the second adaptor waveguide 614 is coupled, optically coupled, to the second transceiver waveguide 424. In the second configuration, the second terminal 604 of the adaptor 600 is coupled to the first channel of the optical transceiver and the first terminal 602 of the adaptor is coupled to the second channel of the optical transceiver. As depicted, when the adaptor is coupled to the optical transceiver in the second configuration, the first adaptor waveguide 612 is optically coupled to the second transceiver waveguide 424 and the second adaptor waveguide 614 is optically coupled to the first transceiver waveguide 416.

As mentioned above, the optical components 700 of the adaptor may be configured such that optical signals of different wavelengths pass between the first and third terminals 602, 606 and between the second and third terminals 604, 606 of the adaptor. Hence, by adjusting the configuration of the adaptor coupled to optical transceiver between the first and second configurations, the wavelengths at which the optical transceiver assembly is to transmit and receiver optical signals via the third terminal of the adaptor can be selectively varied.

The adaptor 600 and the optical transceiver 400 may comprise one or more electrical contacts 404, 618 configured to electrically connect to one another when the adaptor is coupled to the optical transceiver 400 in the first configuration and/or when the adaptor is coupled to the optical transceiver 400 in the second configuration. For example, in the arrangement shown in FIGS. 4*a* and 4*b*, the electrical contacts 404, 618 provided on the adaptor and the optical transmitter are electrically connected when the adaptor is coupled to the optical transceiver in the first configuration and are disconnected when the adaptor is coupled to the optical transceiver in the second configuration. The optical transmitter may be configured to determine the configuration of the adaptor that is coupled to the optical transmitter based on the electrical connection between the electrical contacts 408, 618. In other arrangements, any other configurations of electrical contacts may be provided on the adaptor and the optical transceiver for enabling the optical transceiver to determine the configuration of the adaptor. In further arrangements, the adaptor may comprise one or more magnets, e.g. in place of the electrical contacts 618, and the optical transceiver may comprise one or more magnetic field sensors, e.g. in place of the electrical contacts 404, for detecting the position of the magnets to thereby determine the configuration of the adaptor coupled to the optical transceiver.

As depicted in FIGS. 4*a* and 4*b*, the optical components 700 of the adaptor may comprise a first optical filter 710. The first optical filter 710 may be arranged to pass optical signals between the first and third terminals 602, 606 of the adaptor at the first wavelength, or within the first range of wavelengths. For example, the first optical filter 710 may be a band pass filter. In one or more arrangements, the first wavelength may be approximately 1550 nm, or the first range of wavelengths may include 1550 nm.

The optical components 700 may further comprise a second optical filter 720 arranged to pass optical signals passing between the second terminal 604 and the third terminal 606 at a second wavelength, or within a second range of wavelengths. For example, the second optical filter 720 may be a band pass filter. In one or more arrangements, the second wavelength may be approximately 1310 nm or the second range of wavelengths may include 1310 nm.

The optical components 700 may further comprise first and second collimator lenses 702, 704. The first and second collimator lenses 702, 704 may be optically coupled to the first and second adaptor waveguides 612, 614 respectively. The first and second collimator lenses 702, 704 may be configured to form optical signals carried by the first and second adaptor waveguides 612, 614 into optical beams to pass to the other optical components 700 of the adaptor, e.g. to the first and second filters.

The optical components 700 may further comprise a third collimator lens 706. The third collimator lens may be optically coupled to the third adaptor waveguide 616 for forming optical signals carried by the third adaptor waveguide 616 into optical beams to pass to the other optical components 700.

The optical transceiver 400, e.g. the active region 412 of the optical transceiver, and the adaptor 600 may be configured such that when the first terminal 602 of the adaptor is optically coupled to the first channel of the optical transceiver, e.g. as depicted in FIG. 4*a*, the active region 412 and the first optical filter 710 are together configured to form the cavity laser for transmitting optical signals over the first optical channel at the first wavelength, or within the first range of wavelengths. In a similar way, the optical transceiver 400, e.g. the active region 412, and the adaptor 600 may be configured such that when the second terminal 604 of the adaptor is optically coupled to the first channel of the optical transceiver 400, e.g. as depicted in FIG. 4*b*, the active region 412 and the second optical filter 720 are together configured to form the cavity laser for transmitting optical signals over the first optical channel at the second wavelength or within the second range of wavelengths.

The optical components 700 may further comprise a third optical filter 730. The third optical filter may be configured to pass optical signals at the second wavelength, or within the second range of wavelengths, and reflect other optical signals, e.g. outside the second range of wavelengths. For example, the third optical filter 730 may be configured to reflect optical signals at the first wavelength or within the first range of wavelengths. As depicted, the third optical filter 730 may be arranged to reflect the other optical signals at an angle relative to an incident angle of the optical signals on the third optical filter.

The adaptor 600 may be configured such that optical signals at the second wavelength or within the second range of wavelengths pass through the third optical filter 730 to pass between the second terminal 604 and the third terminal 606. The adaptor may be configured such that optical signals are reflected by the third optical filter to pass between the first and third terminals.

The optical components 700 may further comprise a mirror 740 configured reflect optical signals, e.g. substantially all optical signals, incident on the mirror. The third optical filter 730 and the mirror 740 may be configured to reflect the other optical signals (the optical signals reflected by the third optical filter) such that the other optical signals are passed from the first terminal 602 to the third terminal 606 and/or from the third terminal 606 to the first terminal 602.

Figure 5A:
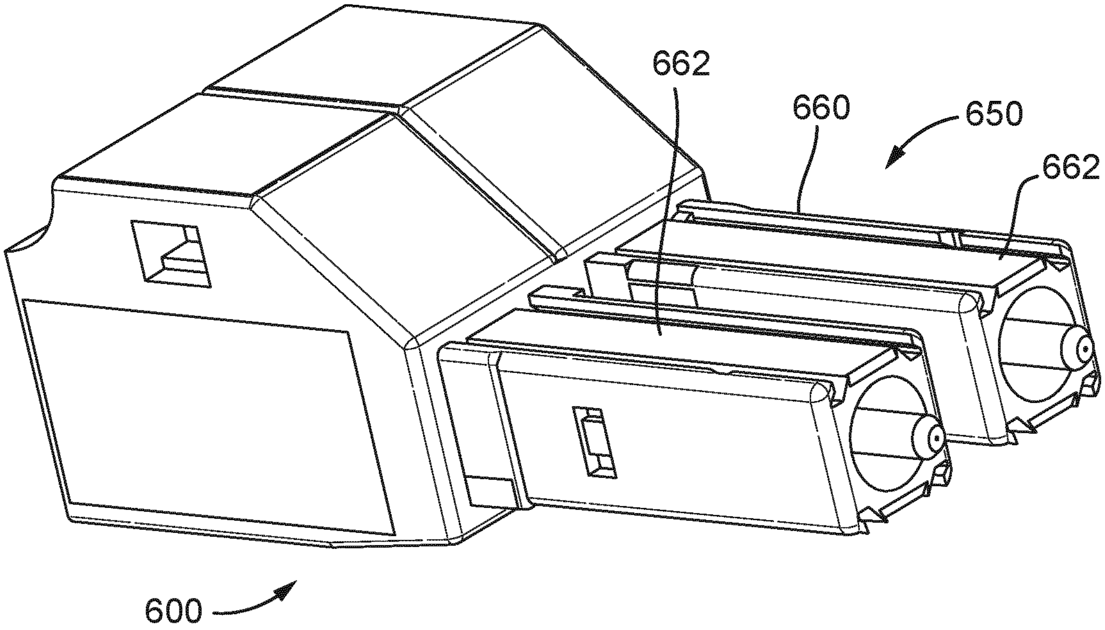
FIG. 5*a* is a perspective view of the adaptor for the optical transceiver assembly depicted in FIG. 3, with a removable portion of a plug body of the adaptor removed.
Figure 5B:
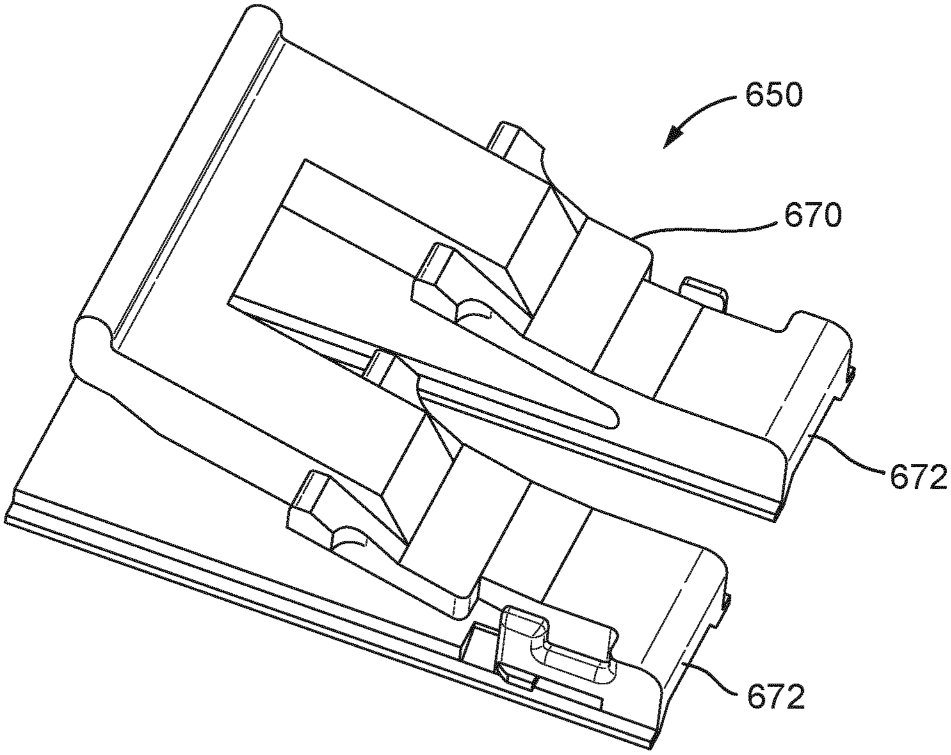
FIG. 5*b* is a perspective view of a removable portion of the plug body for the adaptor shown in FIG. 5*a;*
Figure 6A:
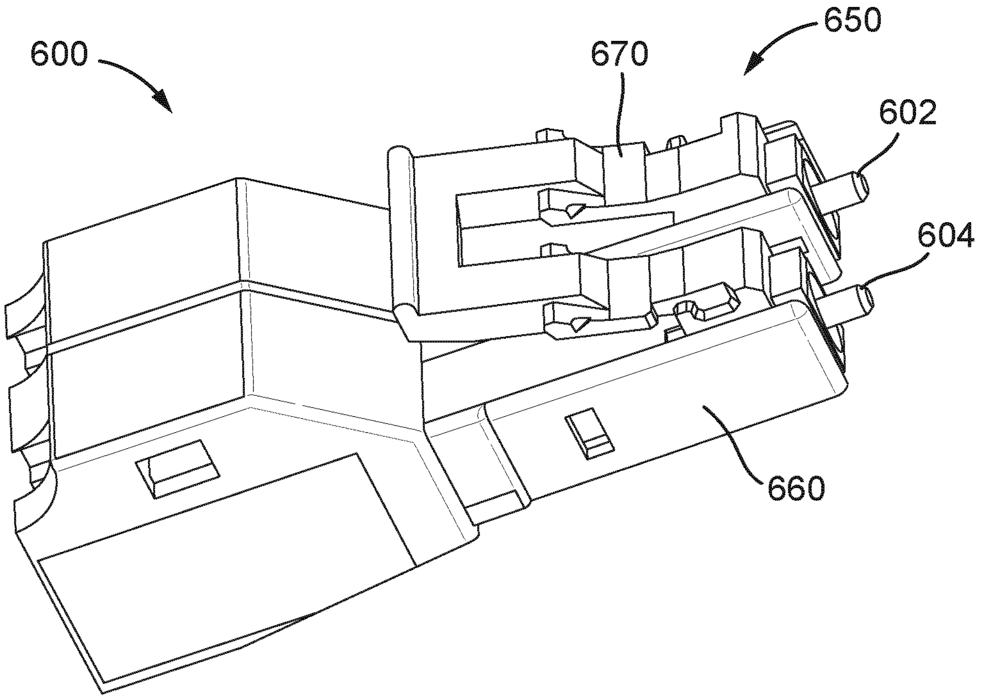
FIGS. 6*a* and 6*b* are top and bottom perspective views of the adaptor shown in FIG. 3 in first and second configurations respectively.
Figure 6B:
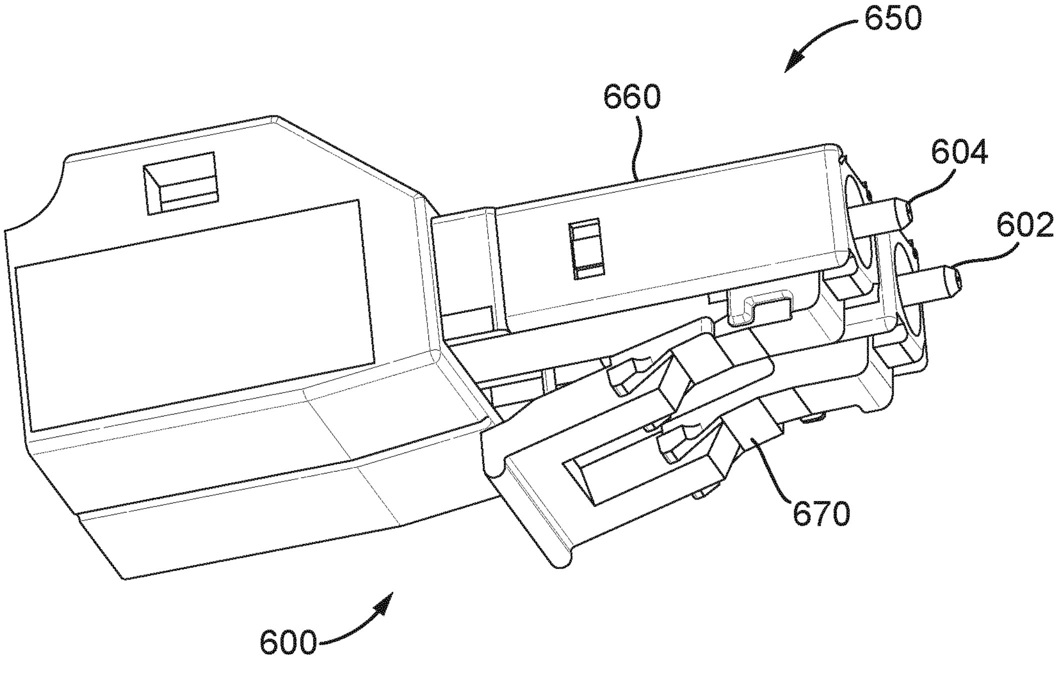

Referring to FIGS. 5*a* and 5*b*, the plug body 650 of the adaptor 600 may comprise a fixed portion 660, illustrated in FIG. 5*a*, and a removable portion 670, illustrated in FIG. 5*b*. The removable portion 670 may be removably couplable to the fixed portion 660 of the plug body in a plurality of positions, as depicted in FIGS. 6*a* and 6*b* respectively, in order to adjust a configuration, e.g. shape, of the plug body 650 and an orientation in which the plug body 650 can be received within the socket 402 of the optical transceiver. In this way, the adaptor 600 may be configurable to couple to the optical transceiver in a first configuration, depicted in FIG. 7*a* or a second configuration depicted in FIG. 7*b*.

The position and/or orientation of the first and second terminals 602, 604 of the adaptor 600 relative to the optical transceiver 400 may vary when the adaptor is coupled to the optical transceiver in the first and second configurations. In particular, when the adaptor is coupled to the optical transceiver in the first configuration, the first terminal 602 may be coupled to the first optical channel of the transceiver and the second terminal 604 may be coupled to the second optical channel of the transceiver. Hence, the first adaptor waveguide 612 may be coupled to the first transmitter waveguide 416 and the second adaptor waveguide 614 may be coupled to the second transmitter waveguide 424. When the adaptor 600 is coupled to the optical transceiver 600 in the second configuration, the first terminal 602 may be coupled to the second optical channel of the transceiver and the second terminal 604 may be coupled to the first optical channel of the transceiver. Hence, the first adaptor waveguide 612 may be coupled to the second transmitter waveguide 424 and the second adaptor waveguide 614 may be coupled to the first transmitter waveguide 416.

As described above with reference to FIGS. 4*a* and 4*b*, when the adaptor is coupled to the transceiver such that the first adaptor optical waveguide 612 is coupled to the first transceiver optical waveguide 416 and the second adaptor optical waveguide 614 is coupled to the second transceiver optical waveguide 424, the optical transceiver assembly is configured to transmit optical signals at the first wavelength and receive optical signals at the second wavelength via the third terminal 606 of the adaptor. Additionally, when the adaptor is coupled to the transceiver such that the first adaptor optical waveguide 612 is coupled to the second transceiver optical waveguide 424 and the second adaptor optical waveguide 614 is coupled to the first transceiver optical waveguide 416, the optical transceiver assembly is configured to transmit optical signals at the second wavelength and receive optical signals at the first wavelength via the third terminal 606 of the adaptor.

Accordingly, by adjusting the configuration of the adaptor, e.g. the shape of the plug body, the wavelengths at which the optical transmitter assembly is configured to transmit and receive optical signal may be selectively varied.

Figure 7A:
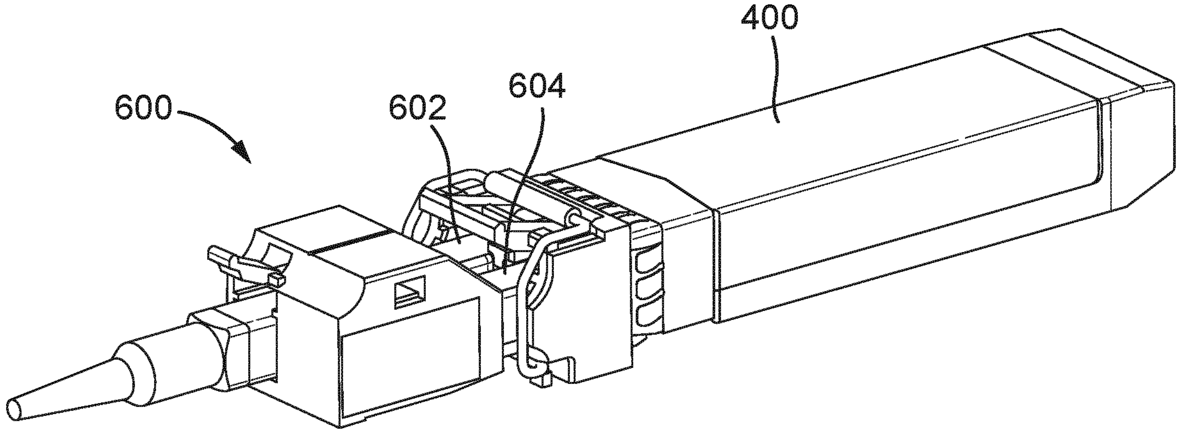
FIGS. 7*a* and 7*b* are perspective views of the optical transceiver assembly shown in FIG. 3, with the adaptor coupled to the optical transceiver in first and second configurations respectively.
Figure 7B:
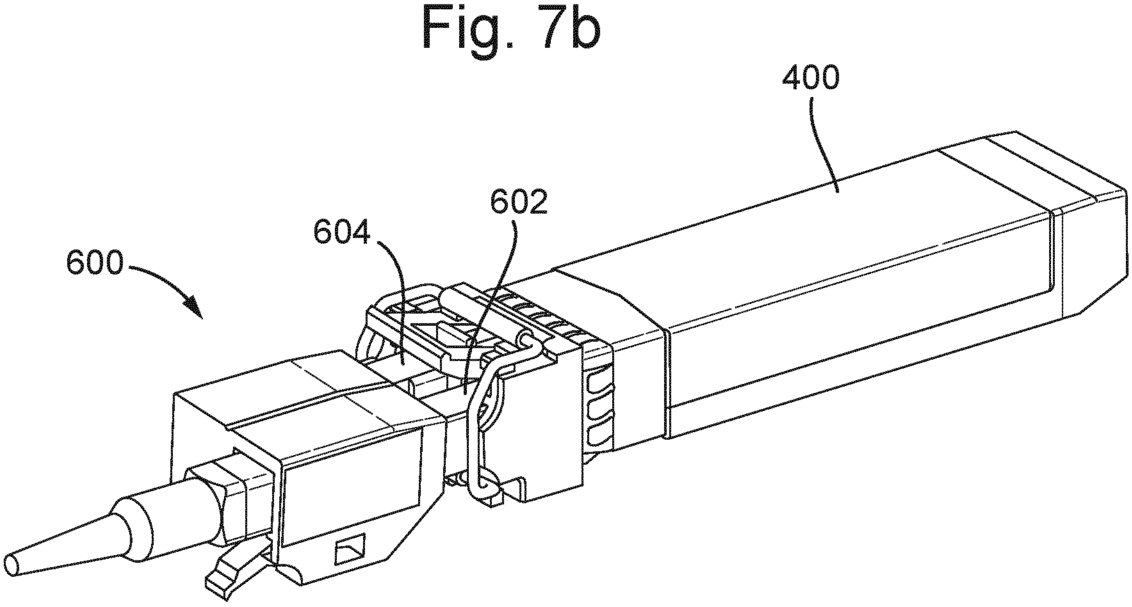

In other arrangements, the adaptor 600 may be couplable to the optical transceiver 400 in either of the configurations depicted FIGS. 7*a* and 7*b* without any changes being made to the adaptor itself (e.g. other than its position and/or orientation relative to the optical transceiver). For example, the plug body of the adaptor may be configured to be received within the socket of the optical transceiver in a plurality of positions and/or orientations without the configuration, e.g. shape, of the plug body being adjusted.

It will be appreciate that by providing two of the optical transceiver assemblies and configuring one of the assemblies such that the adaptor is coupled to the optical transceiver in the first configuration and configuring the other of the optical transceiver assemblies such that the adaptor is coupled to the optical transceiver in the second configuration, bidirectional optical communications can be established between the two optical transceiver assemblies. Advantageously, the two optical transceiver assemblies comprise the same components which can be managed and supplied together and then configured differently to enable the bidirectional optical communication between the two optical transceiver assemblies.

Returning to FIGS. 5*a* and 5*b*, the fixed portion 660 and the removable portion 670 may comprise complementary coupling features for removably coupling the removable portion 670 to the fixed portion 660 in the first and second configurations of the plug body 650. The removable portion 670 may be movably couplable to the fixed portion 660 and may be movable relative to the fixed portion in order to decouple and couple the removable portion from and to the fixed portion, e.g. in either of the first and second configurations of the plug body.

Figure 8:
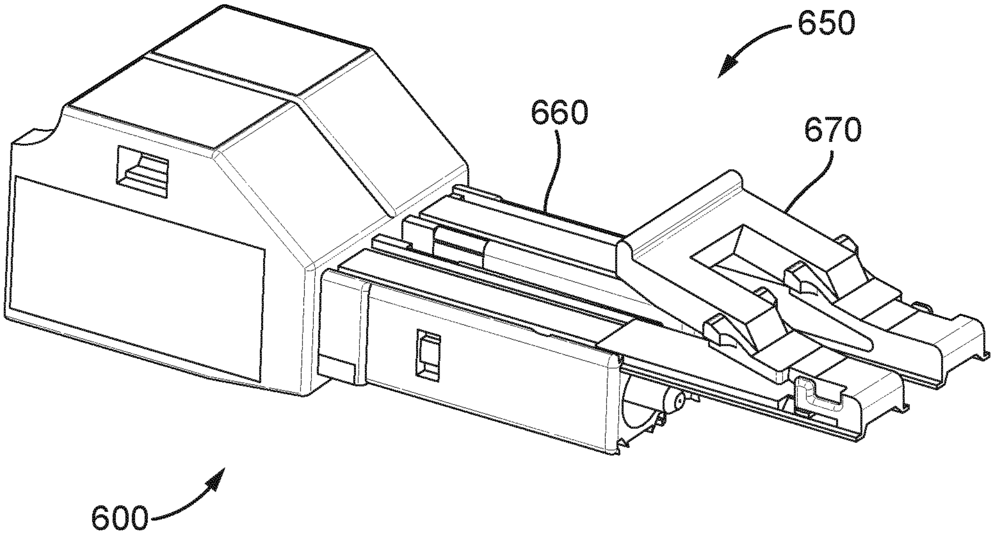
FIG. 8 is a perspective view of the adaptor shown in FIGS. 3 and 6*a* illustrating the movement of the removable portion of the plug body.

In the arrangement depicted, the removable portion 670 of the plug body is slidably couplable to the fixed portion 660. One of the fixed portion and the removable portion of the plug body 650 may comprise rail 662, and the other of the fixed portion and the removable portion of the plug body may comprise a rail engagement feature 672 for slidably engaging the rail 662 to permit the removable portion to be moved, e.g. linearly or slidably moved, relative to the fixed portion, as illustrated in FIG. 8.

Figure 9A:
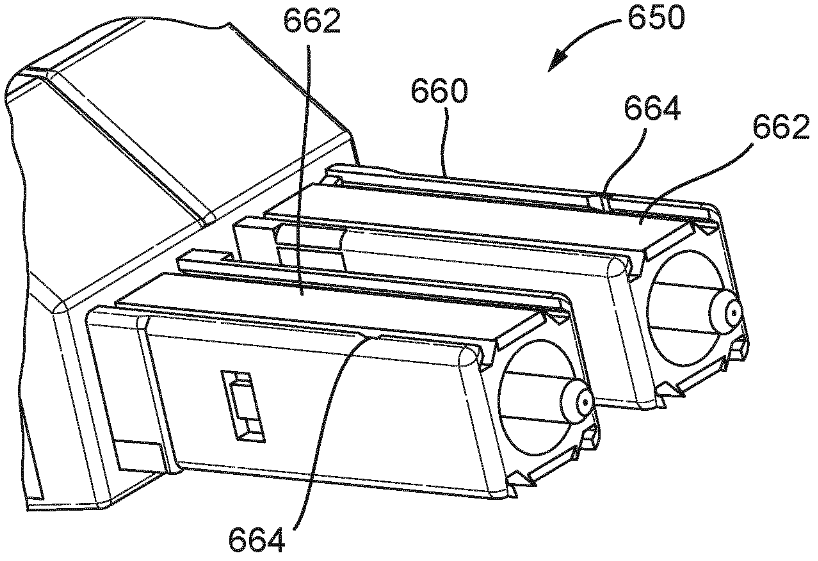
FIG. 9*a* is a partial perspective view of the adaptor showing the fixed portion of the plug body.
Figure 9B:
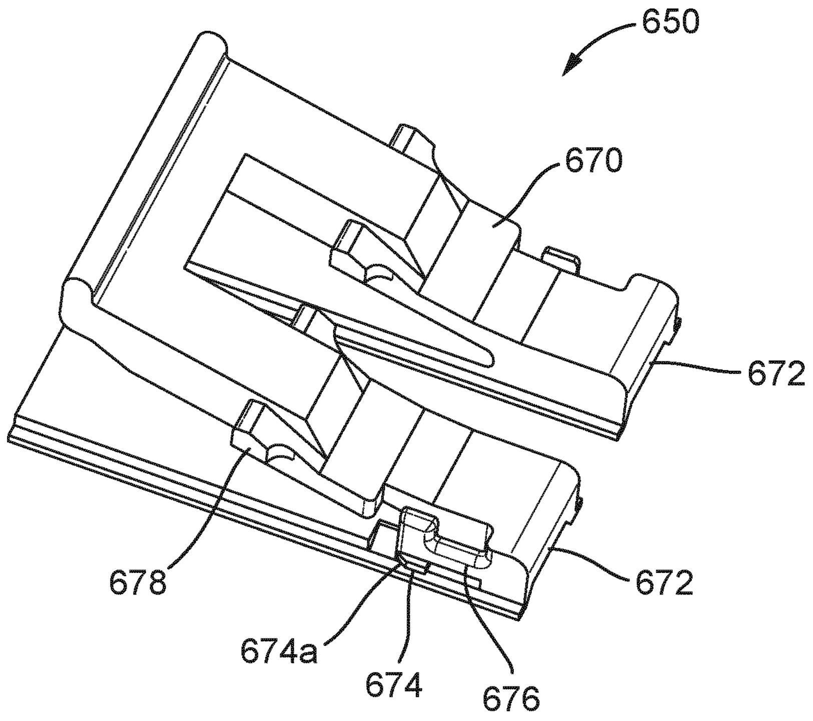
FIG. 9*b* is a perspective view of the removable portion of the plug body of the adaptor.
Figure 9C:
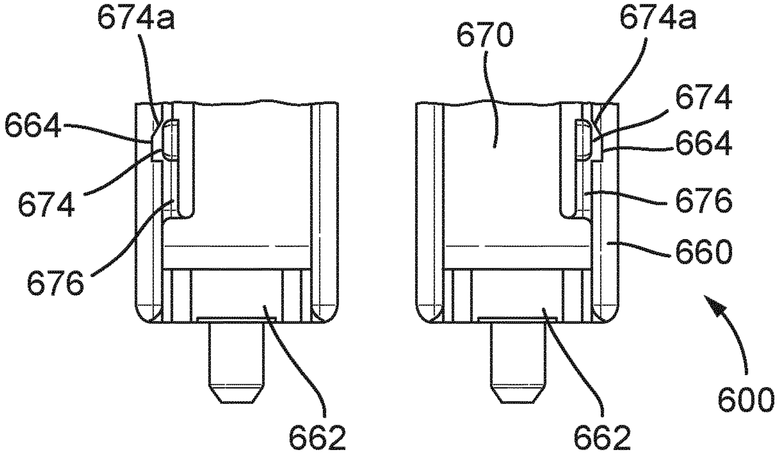
FIG. 9*c* is a partial top view of the adaptor illustrating engagement between the fixed and removable portions of the plug body.

Referring to FIGS. 9*a*, 9*b* and 9*c*, the fixed portion 660 may comprise an anchor feature 664 and the removable portion 670 may comprise an anchor engaging feature 674 configured to engage the anchor feature 664 in order to resist movement of the removable portion 670 relative to the fixed portion 660 when the removable portion 670 is coupled to the fixed portion in the first or second position. In some arrangements, the fixed portion comprises two or more anchor features 664 that are configured to engage the anchor engaging features 674 on the removable portion 670 when the removable portion is coupled to the fixed portion in either of the first and second positions.

In the arrangement shown, the fixed portion 660 comprises two rails 662 for engaging two rail engagement features 672 formed on the removable portion 670. The fixed portion 660 further comprise an anchor feature 664 associated with each rail feature. In particular, the anchor features 664 comprise notches or pockets formed in walls defining the rails 662. The removable portion 670 comprises two anchor engaging features 674 respectively associated with the two rail engagement features 672 of the removable portion 670. The anchor engaging features 674 are configured to be at least partially received within the pockets of the respective anchor features 664, and thereby engage the anchor features, when the removable portion is coupled to the fixed portion in the first and second positions.

The anchor engaging features 674 may be biased into positions in which the anchor engaging features engage the anchor features 664. For example, in the arrangement shown in FIG. 8*b*, the removable portion 670 of the plug body comprises one or more resilient portions 676 and each of the anchor engaging features 674 is coupled to a remaining part of the removable portion 670 by the resilient portions 676. The anchor engaging features 674 and the resilient portions 676 are configured such that when a particular anchor engaging feature 674 is moved away from an engagement position, in which the anchor engagement portion engages the anchor feature, the resilient portion 676 associated with the particular anchor engaging feature is resiliently deformed and therefore acts to bias the anchor engaging feature into the engagement position.

The anchor feature and the anchor engaging feature may be configured such that, when the removable portion 670 is moved relative to the fixed portion 660 of the plug body towards the first or second position, the anchor engaging features 674 are urged into positions from which the anchor engaging features can move, e.g. under the action of the respective resilient portion 676, into engagement with the respective anchor features. In particular, the anchor engaging features 674 may comprise a ramped surface 674*a* configured to engage a corresponding surface of the fixed portion 660, e.g. provided on the rail 662, when the removable portion 670 is moved relative to the fixed portion 660 to urge the anchor engaging portion into the position from which the anchor engaging feature can move to engage the anchor feature.

Although in the arrangements described above, the anchor feature is provided on the fixed portion 660 and the anchor engaging feature is provided on the removable portion 670, it will be appreciated that in other arrangements, any combination of anchor features and anchor engagements features may be provided on the fixed and removable portions of the plug body, which may be configured to engage respective ones of the anchor engaging features and anchor features provided on the other of the first and removable portions of the plug body in the first and second positions of the removable portion, e.g. when the plug body is in the first or second configuration.

The removable portion 670 of the plug body 650 may comprise a retaining feature 678 for engaging the optical transceiver, e.g. the socket 402 of the optical transceiver, when the plug body 650 of the adaptor is received within the socket 402. The retaining feature 678 may be configured to resist removal of the plug body 650 from the socket 402.

The plug body 650, e.g. the combination of the fixed portion 660 and the removable portion 670 of the plug body, may form an optical connector body, e.g. a standard optical connector body, such as an LC or LC/LC connector body or any other standard optical connector body. Similarly, the socket 402 of the optical transceiver may be an optical connector socket, e.g. a standard optical connector socket, such as an LC or LC/LC connector socket or any other standard optical connector socket.

Figure 10:
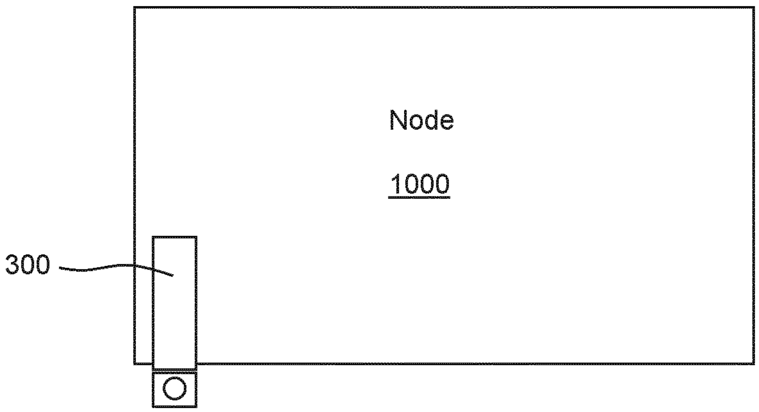
FIG. 10 is a schematic view of an optical network node according to arrangements of the present disclosure.

With reference to FIG. 10, an optical network node 1000, according to the present disclosure, comprises one or more of the optical transceiver assemblies 300 described above. The optical network node 1000 may comprise a radio access network node.

Figure 11:
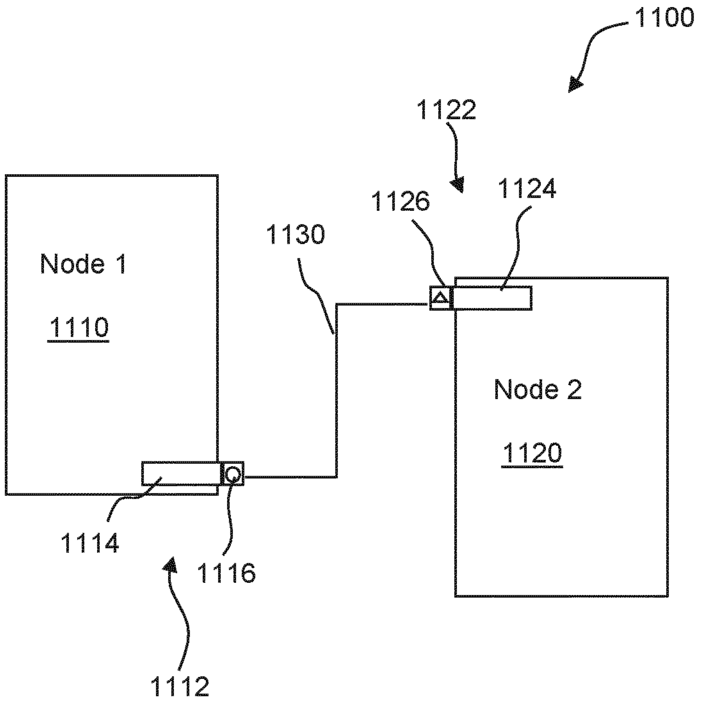
FIG. 11 is a schematic view of a network according to arrangements of the present disclosure.

With reference to FIG. 11 a network 1100, such as a fronthaul network in a radio access network, according to the present disclosure, comprises two or more of the optical network anodes 1000. As mentioned above, each of the optical network nodes 1110, 1120 comprises one or more of the optical transceiver assemblies 300. In the arrangement shown in FIG. 11, the network 1100 comprises a first optical network node 1110 and a second optical network node 1120. For example, the optical network node 1110 may comprise a remote radio unit (RRU), and the optical network node 1120 may comprise a baseband unit (BBU). However, in other arrangements, any number of optical network nodes (e.g. a radio unit (RU), a centralised unit (CU) and a distributed unit (DU)), or other network nodes, may be provided within the network 1100. The first and second optical network nodes 1110 are connected by an optical link 1130, such as an optical fibre cable.

One of the first and second optical network nodes 1110, 1120 comprises at least one optical transceiver assembly 300 including an adaptor configured in the first configuration described above. The other of the first and second optical network nodes 1110, 1120 comprises at least one optical transceiver assembly 300 including an adaptor configured in the second configuration described above. In other words, the first and the second optical network nodes may each comprise at least one optical transceiver assembly having a differently configured adaptor (compared to at least one of the optical transceiver assemblies of the other optical network node).

In the arrangement depicted in FIG. 11, the first optical network node 1110 comprises a first optical transceiver assembly 1112 comprising an adaptor 1116 coupled to an optical transceiver 1114 in the first configuration. For example, the adaptor 1116 may be coupled to the optical transceiver 1114 such that the first optical transceiver assembly 1112 is configured to transmit optical signals at a first wavelength (such as 1550 nm) and receive optical signals at a second wavelength (such as 1310 nm).

The second optical network node 1120 comprises a second optical transceiver assembly 1122 comprising an adaptor 1126 coupled to an optical transceiver 1124 in the second configuration. For example, the adaptor 1126 may be coupled to the optical transceiver 1124 such that the second optical transceiver assembly 1122 is configured to transmit optical signals at the second wavelength (e.g. at 1310 nm) and receive optical signals at the first wavelength (e.g. at 1550 nm).

The optical network nodes 1110, 1120 may be connected to one another via the optical link 1130 arranged to optically couple the first optical transceiver assembly 1112 to the second optical transceiver assembly 1122. In this way, a bidirectional optical connection may be established between the optical network nodes 1110, 1120 of the network.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

The invention claimed is:

1. An adaptor for coupling to an optical transceiver, the adaptor comprising:

a first terminal, the first terminal for optically coupling to one of a first channel and a second channel of the optical transceiver;

a second terminal, the second terminal for optically coupling to the other of the first channel and the second channel of the optical transceiver;

a third terminal defining a bidirectional optical channel of the adaptor; and one or more optical components configured to optically couple the first and second terminals to the third terminal such that optical signals at a first wavelength pass between the first terminal and the third terminal, and optical signals at a second wavelength, different from the first wavelength, pass between the second terminal and the third terminal, wherein one or more of the optical components of the adaptor are configured to cooperate with an active region portion of a cavity laser, the active region portion being provided on the optical transceiver, to form the cavity laser for transmitting optical signals over the first channel, wherein the adaptor is couplable to the optical transceiver in a first configuration, in which the first terminal of the adaptor is coupled to the first channel and the second terminal of the adaptor is coupled to the second channel, and a second configuration, in which the second terminal of the adaptor is optically coupled to the first channel and the first terminal of the adaptor is optically coupled to the second channel.

2. An optical transceiver assembly comprising:

an optical transceiver, wherein the optical transceiver comprises:

an optical transmitter comprising an active region portion of a cavity laser for transmitting optical signals over a first channel of the optical transceiver;

an optical receiver for receiving optical signals over a second channel of the optical transceiver; and an adaptor, the adaptor comprising:

a first terminal, the first terminal for coupling to one of the first channel and the second channel of the optical transceiver;

a second terminal, the second terminal for coupling to the other of the first channel and the second channel of the optical transceiver;

a third terminal defining a bidirectional optical channel of the adaptor; and one or more optical components configured to optically couple the first and second terminals to the third terminal, such that optical signals at a first wavelength pass between the first terminal and the third terminal, and optical signals at a second wavelength, different from the first wavelength, pass between the second terminal and the third terminal, wherein the active region portion in the optical transmitter and one or more of the optical components of the adaptor are together configured to form the cavity laser for transmitting optical signals over the first channel, wherein the adaptor is couplable to the optical transceiver in a first configuration, in which the first terminal of the adaptor is coupled to the first channel and the second terminal of the adaptor is coupled to the second channel, and a second configuration, in which the second terminal of the adaptor is optically coupled to the first channel and the first terminal of the adaptor is optically coupled to the second channel.

3. The optical transceiver assembly of claim 2, wherein the optical components of the adaptor comprise:

a first optical filter configured to pass optical signals passing between the first and third terminals at the first wavelength.

4. The optical transceiver assembly of claim 3, wherein the first optical filter is configured to cooperate with the active region portion of the cavity laser to define the cavity laser for transmitting optical signals over the first channel at the first wavelength, when the first terminal of the adaptor is optically coupled to the first channel of the optical transmitter.

5. The optical transceiver assembly of claim 2, wherein the optical components of the adaptor comprise:

a second optical filter configured to pass optical signals passing between the second terminal and the third terminal at the second wavelength.

6. The adaptor of claim 5, wherein the second optical filter is configured to cooperate with the active region portion of the cavity laser to define the cavity laser for transmitting optical signals over the first channel at the second wavelength, when the second terminal of the adaptor is optically coupled to the first channel of the optical transceiver.

7. An optical network node comprising one or more optical transceiver assemblies according to claim 2.

8. The optical network node of claim 7, wherein the optical node is a radio access network node.

9. The optical transceiver assembly of claim 2, wherein the optical components comprise a third optical filter configured to pass optical signals at the second wavelength and reflect other optical signals.

10. The optical transceiver assembly of claim 9, wherein the adaptor is configured such that optical signals pass through the third optical filter to pass between the second terminal and the third terminal, and wherein the adaptor is configured such that optical signals are reflected by the third optical filter to pass between the first terminal and the third terminal.

11. The optical transceiver assembly of claim 2, wherein the adaptor comprises a plug body to be received within a socket of the optical transceiver such that the first and second terminals of the adaptor are optically coupled to the first and second channels of the optical transceiver respectively, wherein the adaptor is configurable to adjust which of the first and second terminals is optically coupled to the respective first and second channels of the optical transceiver when the plug body is received within the socket.

12. The optical transceiver assembly of claim 11, wherein the plug body comprises a fixed portion and removable portion, wherein the removable portion is removably couplable to the fixed portion in either of a first position and a second position in order to adjust a shape of the plug body and an orientation in which the plug body can be received within the socket of the optical transceiver, to thereby adjust which of the first and second terminals is optically coupled to the respective first and second channels of the optical transceiver when the plug body is received within the socket.

13. The optical transceiver assembly of claim 12, wherein the removable portion comprises a retaining feature for engaging the optical transceiver when the plug body of the adaptor is received within the socket, the retaining feature to resist removal of the plug body from the socket.

14. The optical transceiver assembly of claim 12, wherein the fixed portion and the removable portion of the plug body together form an optical connector body, such as an LC/LC connector body.

15. The optical transceiver assembly of claim 12, wherein the removable portion is movably couplable to the fixed portion, wherein the removable portion is movable relative to the fixed portion in order to remove or attach the removable portion from or to the fixed portion.

16. The optical transceiver assembly of claim 12, wherein one of the fixed portion and the removable portion comprises an anchor feature and the other of the fixed portion and the removable portion comprises an anchor engaging feature configured to engage the anchor feature in order to resist movement of the removable portion relative to the fixed portion.

17. The optical transceiver assembly of claim 16, wherein the anchor engaging feature is biased into a position in which the anchor engaging features engages the anchor feature.

18. The optical transceiver assembly of claim 16, wherein the anchor feature and the anchor engaging feature are configured such that moving the removable portion towards the first or second position of the removable portion urges the anchor engaging feature into a configuration in which the anchor engaging feature can engage the anchor feature.

19. The optical transceiver assembly of claim 12, wherein the fixed portion comprises a rail, wherein the removable portion is movably couplable to the fixed portion at the rail.

20. The optical transceiver assembly of claim 2, wherein the optical components are configured such that optical signals received at the third terminal are output from one of the first terminal and the second terminal depending on a wavelength of the optical signals received at the third terminal.

21. An optical transceiver assembly comprising:

an optical transceiver component, wherein the optical transceiver component comprises an optical transmitter part comprising an active region portion of a cavity laser for transmitting optical signals over a first channel of the optical transceiver and further comprises an optical receiver part configured to receive optical signals over a second channel of the optical transceiver; and an adaptor component couplable to and separable from the optical transceiver component, the adaptor component comprising:

a first terminal, the first terminal being arranged to optically couple to the first channel of the optical transceiver component in a first coupling configuration and to alternatively optically couple to the second channel of the optical transceiver component in a second coupling configuration;

a second terminal, the second terminal being arranged to optically couple to the second channel of the optical transceiver component in the first coupling configuration and to alternatively optically couple to the first channel of the optical transceiver component in the second coupling configuration;

a third terminal defining a bidirectional optical channel of the adaptor; and one or more optical components configured to optically couple the first and second terminals to the third terminal, such that optical signals at a first wavelength pass between the first terminal and the third terminal, and optical signals at a second wavelength, different from the first wavelength, pass between the second terminal and the third terminal, wherein the active region portion and one or more of the optical components of the adaptor are together configured to form the cavity laser for transmitting optical signals over the first channel.

* * * * *